May 13, 1924.
W. CABALA
FRUIT GATHERER
Filed Aug. 16, 1921
1,494,149
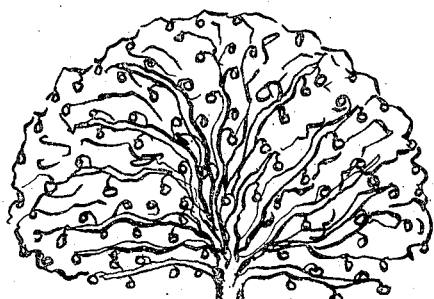
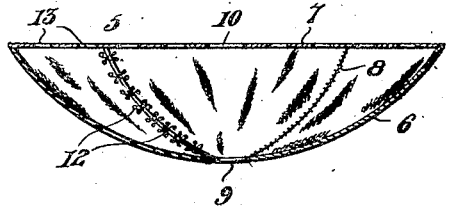
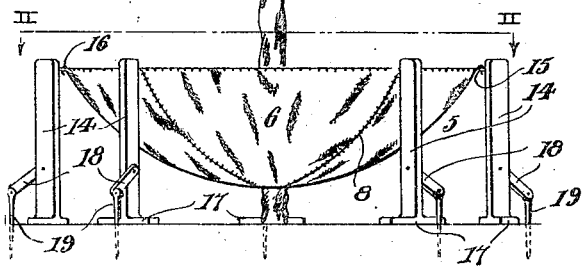
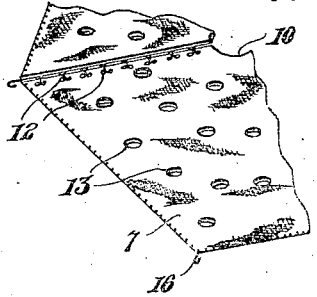
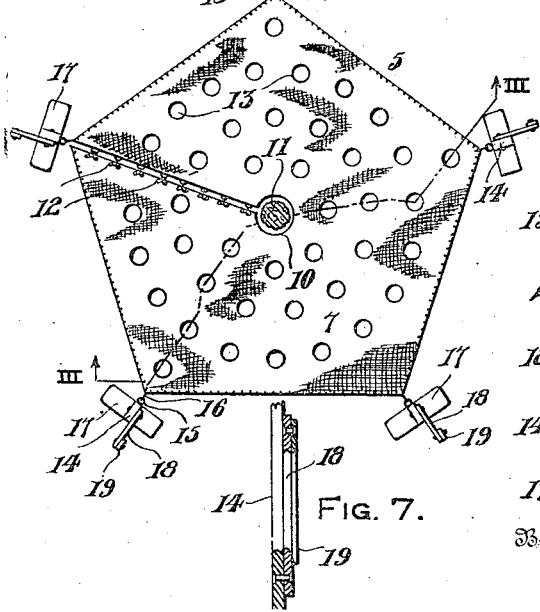
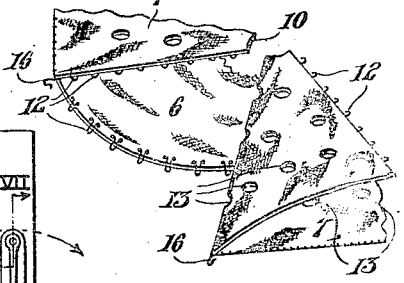
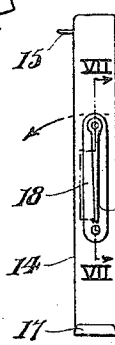
Inventor
W. Cabala
By F. K. Bryant,
Attorney Patented May 13, 1924.

1,494,149

UNITED STATES PATENT OFFICE.

WALTER CABALA, OF BAY CITY, MICHIGAN.

FRUIT GATHERER.

Application filed August 16, 1921. Serial No. 492,778.

*To all whom it may concern:*

Be it known that I, WALTER CABALA, a citizen of Poland, residing at Bay City, in the county of Bay and State of Michigan, have invented certain new and useful Improvements in Fruit Gatherers, of which the following is a specification.

This invention relates to certain new and useful improvements in fruit gatherers and has particular reference to that type of gatherer known as a fruit catcher consisting in a receptacle adapted to be supported about the trunk of a fruit tree in convenient position to receive the fruit as the same is dislodged.

The primary object of the invention is to provide an improved form of fruit gatherer whereby the fruit is effectively collected or gathered so that bruising of the fruit is prevented to a maximum degree.

Another object of the invention is to simplify and improve the specific construction of the fruit container.

Another object of the invention is to provide improved means for supporting the fruit collecting or gathering container in position about the trunk of the fruit tree.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is an elevational view of a fruit gatherer constructed in accordance with the present invention and shown operatively disposed about the trunk of a fruit tree, Figure 2 is a horizontal sectional view taken substantially upon line II—II of Fig. 1 and showing the fruit gatherer in top plan, Figure 3 is a transverse vertical sectional view of the fruit gathering container shown in Figs. 1 and 2 and taken substantially upon line III—III of Fig. 2, Figure 4 is a fragmentary perspective view showing the detachable connection between the meeting edges of the top of the fruit container, Figure 5 is a view somewhat similar to Fig. 4 with a portion of the top and bottom turned backwardly to reveal an edge portion of the bottom of the container.

Figure 6 is an elevational view of one of the supporting uprights for the container with its ground engaging spur collapsed, and Figure 7 is a fragmentary sectional view on line VII—VII of Fig. 6.

Referring more in detail to the several views, the present invention embodies a fruit collector or gathering container 5 embodying a body or bottom member 6 of concave form when operatively disposed with the open top thereof spanned by a substantially flat top or cover member 7 when in use, the members 6 and 7 being preferably of polygonal form in plan as shown in Fig. 2 and the bottom member being preferably constructed of a plurality of segmental sections stitched together along adjacent edges as at 8. The bottom member 6 is provided with a central opening 9 and the top member 6 is provided with a central opening 10 for reception of the trunk 11 of the fruit tree, which trunk is admitted to the openings 9 and 10 by the provision of radial slits in the members 6 and 7, adjacent edges of which are detachably connected by separable fasteners such as hooks and eyes generally denoted by the numeral 12. Thus, when the container 5 is supported about the trunk of the tree a slight distance from the ground as shown in Fig. 1, the trunk of the tree is arranged centrally through the container with the bottom member 6 in the form of a receptacle, the open top of which is spanned by the top member 7, and the top member 7 is provided with numerous openings 13 through which the fruit may pass into the bottom member 6 as said fruit is dislodged to fall by gravity onto the top member 7. In this way, the fruit is prevented from falling directly upon that which has been collected in the bottom member 6 so as to reduce bruising of the fruit to a minimum, and as the bottom member is substantially imperforate, the fruit is effectively collected therein. When the desired amount of fruit has been collected, the device may be readily detached and taken to another point of use by simply disconnecting the members of the separable fasteners 12.

The preferred means for supporting the container 5 in position about the trunk 11 embodies a series of uprights 14 adapted to be positioned at the corner portions of the container and having eyes 15 at the upper ends thereof adapted to be engaged by hook members 16 which are fastened to the corners of the top member 7 for supporting the receptacle in position. As a means for anchoring the uprights 14 and preventing ready tilting of the same, the lower ends of said uprights are preferably provided with relatively wide or large bases 17, and a link 18 is pivotally attached at one side of each upright 14 and has a ground engaging spur 19 pivoted to the other end thereof so that the link and spur may be swung outwardly with the spur penetrating the ground as shown in Fig. 1 or so that the link and spur may be folded one upon the other and upon the upright when not required for use. Thus the supporting means embodies a plurality of collapsible ground engaging spurs carried by uprights in such manner as to provide a readily portable device.

While it is stated that the top member of the container assumes a substantially flat horizontal position when in use, the same actually sags a little from the outer edge of the same inwardly toward the center thereof, and in view of the numerous holes provided therethrough, when taken with the rebounding of the fruit as the same lands upon the top member, it will be seen that said fruit will substantially all seek an opening and pass through to the bottom of the container, the openings being numerous for this purpose. Should any of the fruit fail to pass through the top member at any time, said top member may be agitated in any suitable way by the attendant for causing the fruit to pass through. As the fruit is ordinarily not taken out of the bottom member until all of the fruit has been shaken from the tree, the device is usually taken down when it is desired to remove the fruit from the container. However, it is obvious that access may be provided to the interior of the container for this purpose by disconnecting any desired ones of the fasteners 12.

In view of the foregoing it is believed that the construction and operation as well as the advantages of the present invention will be readily understood and appreciated by those skilled in the art.

Minor changes may be made in the invention without departing from the spirit and scope thereof as claimed.

What is claimed as new is:—

1. A container for the collection of fruit as the same is dislodged from a fruit tree embodying a relatively large fabric receptacle composed of a substantially imperforate bottom member having an open top and a perforated top member covering said open top and adapted to assume a substantially flat horizontal position when in use with the perforations of the top member adapted to admit the fruit therethrough into the bottom member, said top and bottom members being provided with alined central openings adapted to receive the trunk of the fruit tree and having radial slits leading from the edges thereof to the central openings whereby said trunk may be admitted to the central openings, means to detachably connect the adjacent edges of the top and bottom members at said slits, hooks fastened to the marginal portion of said container at spaced uniform intervals, supporting standards for the container having eyes at the upper ends thereof for reception of said hooks, said standards having relatively large bases and having links pivoted thereto, and ground engaging spurs pivoted to the links whereby the spurs and links may fold onto the sides of the standards when not required for use, said spurs being arranged to anchor the standards in an upright position when engaging the ground.

2. A container for the collection of fruit as the same is dislodged from a fruit tree embodying a relatively large fabric receptacle adapted to be positioned beneath substantially the entire tree and composed, when in its operative position, of substantially an imperforate concave bottom, constructed from a plurality of segments stitched together at their adjacent edges with the exception of one pair of edges that are separably connected, and an open top, a top or shield having spaced openings associated with substantially its entire area, stitched at its outer edges to the outer edges of the said receptacle and separably connected at a pair of radially disposed adjacent edges which are positioned above the separably connected edges of said receptacle, circular alined openings centrally positioned in said receptacle and cover and adapted to receive the trunk of the tree admitted thereto through the separably connected edges, hooks fastened to the outer connected edges of the receptacle cover at spaced uniform intervals, and supporting standards for the receptacle and cover having eyes at the upper ends thereof for reception of said hooks, said standards having relatively large bases and having links pivoted thereto, and ground engaging spurs pivoted to the links whereby the spurs and links may fold onto the sides of the standards when not required for use, said spurs being arranged to anchor the standards in an upright position when engaging the ground.

In testimony whereof I affix my signature.

WALTER CABALA.